United States Patent Office 2,955,336
Patented Oct. 11, 1960

2,955,336

SHELL MOLDING SAND AND THE PROCESS OF MAKING AND USING THE SAME

John S. Horn, Lake Bluff, Ill., and Julius M. Bleuenstein, Dearborn, Mich.; said Bleuenstein assignor to Ford Motor Company, Dearborn, Mich., a corporation of Delaware, and said Horn assignor to American-Marietta Company, Chicago, Ill., a corporation of Illinois No Drawing. Filed Aug. 6, 1956, Ser. No. 602,456

13 Claims. (Cl. 22—193)

This invention relates to the shell molding art and more particularly to a process and composition of matter useful in the production of molds of this type. While the invention is especially applicable to the production of shell molds it is not so limited and may be employed wherever it is desired to produce a sand-resin element for the confining and shaping of molten metals. A blown sand-resin core is an example of a structure to which this invention is directed and which is not strictly speaking a shell mold. The term mold as employed in this document is accordingly to be understood to include any metal confining sand structure.

This application is a continuation-in-part of Serial No. 584,894, filed May 15, 1956, by applicants herein, now abandoned.

Recently, the art has turned extensively to the use of sand liquid-resin compositions in a process in which the sand grains are entirely coated with a thin layer of partially reacted dried resin as opposed to the former practice in which the sand and dry resin particles were merely mixed. This invention is predicated upon a sand coating process involving the use of aqueous-borne phenol-formaldehyde resin in which the mol ratio of formaldehyde to phenol is greater than one to one and in the range of about 1.1:1 to about 2:1, and preferably in the range of 1.4:1 to about 1.8:1. This type of resin is known to the art as a "one-step resin" and is clearly distinguishable from the two-step (novolak-type) resins which require additional aldehyde as well as heat to promote curing. The aqueous-borne resins employed in this invention have been partially reacted and carry with them a substantial portion of water. These resins may be in the form of a readily pourable liquid containing about 68% solids and having a preferable viscosity of about 1300–1700 centipoises at standard temperatures. Practical solids contents may vary from about 50% to about 75%. A portion of organic solvent may be incorporated in the resin composition if necessary or convenient in the fabrication of the resin and such solvent may be substituted in substantial amount for water.

This invention departs directly from established practices in that the "one-step" resin-coated sand is produced and the product enhanced by the use of hexamethylene tetramine (hereafter called "HMT"). This component, in amounts from two to twenty-five percent based upon the aqueous-borne resin contents, is incorporated in the sand-resin mixture. A more preferred and narrower range is five to fifteen percent of HMT to the aqueous-borne resin, and a preferable specific ratio of ten percent HMT to the aqueous-borne resin content produces very satisfactory results. Despite the obvious excess of formaldehyde already existing in the one-step resin component, unexpected advantages such as improved tensile strength and a wider operable range of fusion temperatures of the resin-coated sand are obtained from the conjoint use of HMT.

This invention has been described particularly in connection with resins based upon phenol and formaldehyde catalyzed by the use of calcium hydroxide. However, the term resin as used herein is to be understood to include the whole class of resins which is dependent upon the reaction between a phenol, including phenol per se, and an aldehydic CHO group.

The addition of a resin containing a substantial portion of water to a sand base produces a wet or pasty mixture which is well suited to uniformly coating each sand grain with a resin layer. However, a dry free-flowing composition must eventually be produced and this requires that the water of the composition be eliminated. It is necessary that this water be evaporated without heating the resin to a point such that its ability to later fuse and bond the sand to form satisfactory shell molds is substantially impaired. The water must be evaporated with the concomitant expenditure of energy. This necessary energy may be supplied by any of at least three readily available routes.

First, the sand may be preheated to a temperature, between about 100 degrees and about 450 degrees Fahrenheit, that will not adversely affect the resin and at the same time will speed the evaporation of the water during mixing. Second, a stream of heated air may be blown through the mixture as mixing proceeds. An air temperature range of 300 degrees to 350 degrees Fahrenheit has been found suitable for this purpose although obviously other temperatures may be employed. Third, the mixing may be sufficiently intensive mechanically to add sufficient frictional heat to accomplish the evaporation. Any desired combination of these three heat sources may be employed. It follows that if time is not of the essence, the mixing may be conducted in the presence of a voluminous stream of cold air and the evaporation accomplished in an extended time period.

The exact amount of resin to be used with any particular sand is not critical and will follow conventional shell molding practice. In this practice we usually employ an aqueous-borne resin content amounting to from 1.5% to about 10% by weight of the sand. A ratio of three parts aqueous-borne resin (70% solids content) to 100 parts of clean sand by weight produces suitable tensile strength at practical mixing times. Unclean sands that include dust and dirt generally require a greater resin-to-sand ratio than do washed or clean sands.

*Example 1*

A suitable resin was formed from the following ingredients:

| Ingredient: | Percentage by weight |
|---|---|
| 90% phenol (per se) | 42.59 |
| Calcium hydroxide | .81 |
| $H_2O$ | 1.63 |
| 37% formaldehyde | 52.91 |
| Ethanol | 2.06 |

The phenol was introduced to a jacketed kettle and the lime admixed with water was added. The mixture was heated at 45° C., while being agitated, for 15 minutes. The formalin was added to the heated contents of the kettle and the charge heated to 90° C. in 60 minutes and then held at 90° C. for about 80 minutes until a sample became cloudy when cooled to room temperature, about 25° C. The resin was dehydrated under vacuum until 31% of the total batch weight had been removed as water. During dehydration the temperature was allowed to fall to 60° C. Steam was applied to the jacketed kettle to maintain the temperature at 60° C. until dehydration as above was completed. The batch was then cooled to about 35° C., whereupon the ethanol was added and the mixture stirred about 15 to 20 minutes.

The aqueous-borne resin thus produced had the following physical properties at 25° C.:

| | |
|---|---|
| Viscosity | About 1500 cps. |
| Spec. gravity | 1.233. |
| Ref. index | 1.5537. |
| Solids content | 68% (determined at 135° C.). |
| pH | 7.9. |
| Free HCHO | Less than 1%. |
| Water tolerance | 15%. |

The operational range of viscosities for such a resin may vary between about 1000 and 2500 centipoises measured at 25° C. A preferred range is between about 1300 and about 1700 centipoises.

*Example 2*

A successful shell molding sand, suitable for dump box molding, as well as core fabrication, has been prepared by intensively mulling together in a Beardsley-Piper muller 200 pounds of No. 90 A.F.S. Juaniata Bank sand having a clay content of about one percent, 8½ pounds of aqueous-borne resin and 0.85 pound of HMT. The resin in this case was a lime-catalyzed phenol-formaldehyde resin as described above in which the mol ratio between formaldehyde and phenol was about 1.6 to 1. This mixture was mulled for approximately six minutes during which time air heated to between 300° and 350° F. was blown through the muller. The mechanical power supplied to the muller reached a peak of forty horsepower three minutes after the muller started. This was indicated by a current draw of forty amperes in the motor lead. The very substantial frictional heat developed in the muller plus the flow of hot air through the muller resulted in the rapid evaporation of the water of the resin without advancing the degree of polymerization of the resin to an appreciable extent as evidenced later by desirable fusion of the resin coated sand particles. As the mixture dried, the flow of current to the driving motor decayed to 22 amperes and the cohesive mixture broke down into the required free-flowing discrete particles of resin-coated sand. The sand at this time had a temperature of between 120° and 130° F. After the sand has been thoroughly coated and completely broken down to the dry free-flowing condition a parting agent, such as fats, waxes, natural and synthetic, calcium stearate or other alkaline earth metal soaps and the like, may be added and mulled in to improve the action of the sand upon the heated patterns. While it is preferable to add the parting agent after the sand is completely broken down, it may be added earlier in the process of coating the sand. A particularly effective parting agent is the wax-like bisamide formed by reacting 2 mols of stearic acid, for example, with one mol of ethylene diamine, which is sold in the trade under the trademark "Acrawax C" as manufactured by Glyco Products Co., Brooklyn 2, New York.

*Example 3*

For the purposes of determining the effect of HMT on the lime-catalyzed resin-sand mixture, two laboratory mixes of coated sands were produced and tested for tensile strength.

| Step or Ingredient | | Mix 1 | Mix 2 |
|---|---|---|---|
| No. 50 Blast Sand | g | 1,000 | 1,000 |
| Phenolic Resin of Example One | g | 30 | 30 |
| Hexamethylene Tetramine (HMT) | g | 3 | ------ |
| "Acrawax C" | g | .9 | .9 |
| Mull Time | mins | 20 | 20 |
| Sand Temperature | °F | 70 | 70 |
| Air Flow to Muller | | None | None |
| Time to Max. Cohesiveness (break point) | mins | 13 | 15 |
| Avg. Melt Point of Resin | °F | 180 | 165 |
| Avg. Tensile Strength | p.s.i | 472 | 358 |

It can be seen that the use of HMT caused an increase in both the melt point of the resin coating and in the tensile strength of the cured sand-resin combination.

The "melt point" is defined as the temperature at which the resin-coated dry sand sticks to a clean steel bar, heated at one end, after contact for one minute.

Tensile strengths reported herein were measured in accordance with the techniques and procedures prescribed by the Shell Molding Materials Testing Committee (8–N) of the Sand Division of the American Foundrymen's Society as reported in its "Tentative Shell Tensile Test" reported in "Modern Castings and American Foundryman," pp. 69–70 of the issue for December 1955.

"Mulling" as used in this specification refers to the conjoint mechanical working of mixtures of sand particles and aqueous-borne resins whereby the resin is substantially uniformly coated on the sand particles. During mulling the sand and resin while undried assumes a stiff granular plastic cohesiveness because of the squeezing, agitating and working in the muller. As the process continues and drying takes place, the mulled mass will "break" and the sand rapidly becomes discrete and free-flowing. Continued working results in the sand crumbling and returning to a dry, free-flowing state quite similar to that of the original untreated sand particles. "Blocking" in a resin-coated sand is the property of the dry sand upon standing to tend to form lumps. Severe blocking produced lumps most difficult to crumble. Minor and unobjectionable blocking occurs where there may be lumps easily friable by light finger pressure or mere mechanical movement or shaking.

While we have described a calcium-catalyzed phenolic resin, it will be apparent to those skilled in the art that other alkaline-catalyzed resins, such as sodium hydroxide-catalyzed resins, will function in this process with equal facility.

It is essential that the resins employed have drying characteristics permitting coating in suitable short periods of time. Both calcium and sodium-catalyzed resins meet normal requirements in this respect.

Additional liquid-resin coated sands were produced and tested as follows:

*Example 4*

Ten pounds of Wedron No. 8 sand was introduced into a Beardsley & Piper Mulbaro muller equipped with a forced air draft, together with 0.3 pound of a lime-catalyzed, phenolformaldehyde resin having a mol ratio of 1.6 and about .03 pound of HMT. This mixture was mulled with 60°–80° F. air blowing over the sand. After about four minutes the mixture built up to a maximum consistency and "broke." Three grams of "Acrawax C" were added at this time. Mulling was continued until a free-flowing, resin-coated sand was obtained in about nine minutes' total time. This coated sand had a tensile strength of 550 p.s.i.

*Example 5*

One thousand gms. of No. 50 blast sand having a fineness number of about 85 were introduced at room temperature into a laboratory muller having an open top. To the sand were added 30 grams of a lime-catalyzed, phenol-formaldehyde resin having a mol ratio of 1.6, 10 gms. "Vinsol Resin," 3 gms. of HMT and 3 gms. of ethyl alcohol. This mixture was mulled without use of a forced air draft. The mix became "heavy" after about nine minutes, at which time 0.9 gm. of "Acrawax C" was added.

The "Vinsol Resin" is a proprietary resin manufactured by Hercules Powder Company, Naval Stores Department, Wilmington, Delaware. This resin is a hard, brittle, dark-colored, thermoplastic resin derived from pine wood. It is commonly used as a modifier or extender for phenol-formaldehyde resin and is distinguishable from resin-like materials.

After mulling for a total time of twenty minutes the sand was uniformly resin-coated and free-flowing. The tensile strength of the cured sand was 430 p.s.i. when tested according to the A.F.S. "Tentative Shell Tensile Test."

It is known that a higher melt point is obtained with identical phenolic resins and sands when HMT is included as against its omission. The increase of melt point obtained from the HMT permits the production of shell molding resin-coated sands having reduced blocking tendencies and increased bonding efficiencies. There is an increase in bonding efficiency due to an increase in flow of the resin during the formation of the shell mold in a hot forming operation.

With the foregoing described resin-coated sands, shell molds may be produced by applying the coated sand to heated metallic patterns in the conventional manner. The sand coated patterns are introduced to heat chambers while the patterns are about 400°–550° F. and there subjected to curing of the shell mold which may be easily and safely stripped from the pattern and used in normal foundry practices.

Having thus described our invention, we claim:

1. The process of preparing a free flowing resin-coated shell molding sand comprising admixing a composition including one-step, aqueous-borne phenolic resin, molding sand and hexamethylene tetramine in an amount of 2% to 25% based on the one-step, aqueous-borne phenolic resin, said resin in the presence of the water associated therewith being an aqueous lime-catalyzed phenol-aldehyde pourable liquid-resin having a mol ratio of aldehyde to phenol in the range of about 1.1:1 to about 2:1 and containing from about 50% to about 75% resin solids, simultaneously mixing this composition and evaporating the water without heating to temperatures destructive of the thermoplastic character of the resin until a substantially dry and free-flowing product is obtained in which each grain of sand is coated with a dry layer of resin containing substantially unreacted hexamethylene tetramine, and maintaining the temperature of the mix during the entire operation below a value which would substantially impair the ability of the sand-resin mix to later condense to form shell molds.

2. The process of preparing a free-flowing resin-coated shell molding sand comprising admixing a composition including one-step, aqueous-borne phenolic resin, molding sand and hexamethylene tetramine, in an amount of 2% to 25% based on the one-step, aqueous-borne phenolic resin, said resin in the presence of the water associated therewith being an aqueous alkaline-catalyzed phenol-aldehyde pourable liquid-resin having a mol ratio of aldehyde to phenol in the range of about 1.1:1 to about 2:1 and containing from about 50% to about 75% resin solids, simultaneously mixing this composition and evaporating the water without heating to temperatures destructive of the thermoplastic character of the resin until a substantially dry and free-flowing product is obtained in which each grain of sand is coated with a dry layer of resin containing substantially unreacted hexamethylene tetramine, and maintaining the temperature of the mix during the entire operation below a value which would substantially impair the ability of the sand-resin mix to later condense to form shell molds.

3. The process of preparing a free-flowing resin-coated shell molding sand comprising admixing a composition including one-step, aqueous-borne phenolic resin, molding sand and hexamethylene tetramine in an amount of 2% to 25% based on the one-step, aqueous-borne phenolic resin, said resin in the presence of the water associated therewith being an aqueous lime-catalyzed phenol-formaldehyde pourable liquid-resin having a mol ratio of formaldehyde to phenol in the range of about 1.1:1 to about 2:1 and containing from about 50% to about 75% resin solids, simultaneously mixing this composition and evaporating the water without heating to temperature destructive of the thermoplastic character of the resin until a substantially dry and free-flowing product is obtained in which each grain of sand is coated with a dry layer of resin containing substantially unreacted hexamethylene tetramine, and maintaining the temperature of the mix during the entire operation below a value which would substantially impair the ability of the sand-resin mix to later condense to form shell molds.

4. The subject matter of claim 3 in which at least a portion of the energy necessary for the water evaporation is supplied by the frictional heat of mixing.

5. The process of claim 3 in which at least a portion of the energy necessary for the water evaporation is supplied by a heated stream of air passed in contact with the mixture during mixing.

6. The process of claim 3 in which at least a portion of the energy necessary for the water evaporation is supplied from the sensible heat in the sand grains.

7. The process of claim 3 in which the mol ratio of aldehyde to phenol is in the range of 1.4:1 to about 1.8:1.

8. The process of claim 3 in which the mol ratio of aldehyde to phenol is approximately 1.6:1.

9. The process of claim 3 in which the hexamethylene tetramine is employed in a ratio of from 5% to 15% based on the weight of the aqueous-borne resin.

10. The process of claim 3 in which the hexamethylene tetramine is employed in a ratio of 10% based on the weight of the aqueous-borne resin content.

11. The process of preparing a free-flowing resin-coated shell molding sand comprising preparing a composition including one-step, aqueous-borne phenolic resin, molding sand and hexamethylene tetramine in an amount of 5% to 15% based on the one-step, aqueous-borne phenolic resin; said resin in the presence of the water associated therewith being an aqueous, lime-catalyzed, phenol-formaldehyde, pourable liquid-resin having a mol ratio of the aldehyde to phenol in the range of about 1.1:1 to about 2:1, and containing from about 50% to about 75% resin solids, and said resin being employed at a ratio of between 1.5% and about 10% based on the weight of the molding sand in the composition; simultaneously mixing this composition and evaporating the water without heating to temperatures destructive of the thermoplastic character of the resin until a substantially dry and free-flowing discrete product is obtained in which each grain of sand is coated with a dry layer of resin containing substantially unreacted hexamethylene tetramine and maintaining the temperature of the mix during the entire operation below a value which would substantially impair the ability of the resin-coated sand to later fuse to form shell molds.

12. The process of producing shell molds, comprising preparing a free-flowing resin-coated shell molding sand by mixing one-step, aqueous-borne phenolic resin, molding sand and hexamethylene tetramine in an amount of 2% to 25% based on the one-step, aqueous-borne phenolic resin; said resin in the presence of the water associated therewith being an aqueous, lime-catalyzed, phenol-formaldehyde pourable liquid-resin having a mol ratio of aldehyde to phenol in the range of about 1.1:1 to about 2:1, and containing from about 50% to about 75% resin solids; simultaneously mixing this composition and evaporating the water without heating to temperatures destructive of the thermoplastic character of the resin until a substantially dry and free-flowing discrete product is obtained in which each grain of sand is coated with a dry layer of resin containing substantially, unreacted hexamethylene tetramine, maintaining the temperature of the mix during the entire operation below the value which would substantially impair the ability of the resin-coated sand to later fuse to form a shell mold; applying the coated sand to a heated metallic pattern; subjecting the molded sand to curing temperatures at a value which fuses the resin-coated sand particles together, and stripping the resulting shell mold from the pattern.

13. A free-flowing resin-coated shell molding sand consisting essentially of sand particles as core material surrounded by a surface layer of one-step, alkaline catalyzed phenol-aldehyde resin having a mol ratio of aldehyde to phenol in the range between about 1.1:1 and about 2:1 in a thermoplastic stage of polymerization and having uniformly distributed in said surface layer from about 2% to about 25% of substantially unreacted hexamethylene tetramine.

References Cited in the file of this patent

UNITED STATES PATENTS

| | | |
|---|---|---|
| 2,424,787 | Adams | July 29, 1947 |
| 2,465,299 | Wachter | Mar. 22, 1949 |
| 2,692,246 | Less et al. | Oct. 19, 1954 |
| 2,706,163 | Fitko | Apr. 12, 1955 |
| 2,733,489 | Dahmer | Feb. 7, 1956 |
| 2,736,077 | Bartlett | Feb. 28, 1956 |
| 2,763,626 | Salzberg | Sept. 18, 1956 |

OTHER REFERENCES

The Chemistry of Synthetic Resins, vol. 1, pp. 314–329, Reinhold Publishing Co., 1935.

The Chemistry of Phenolic Resins, R. E. Martin, pages 87–89, 1956.

FIAT Final Report No. 1168 PB 81284 (5 pages), May 30, 1947.

The Foundry, Ames et al., August 1950, pages 92–96, 206–217.

UNITED STATES PATENT OFFICE
CERTIFICATE OF CORRECTION

Patent No. 2,955,336                                  October 11, 1960

John S. Horn et al.

It is hereby certified that error appears in the printed specification of the above numbered patent requiring correction and that the said Letters Patent should read as corrected below.

Column 5, lines 37 and 38, claim 1, lines 57 and 58, claim 2, and column 6, lines 2 and 3, claim 3, strike out "containing substantially unreacted hexamethylene tetramine,", each occurrence, and insert instead -- and hexamethylene tetramine, said hexamethylene tetramine being present in a substantially uncombined state, --; same column 6, lines 45 and 46, claim 11, strike out "containing substantially unreacted hexamethylene tetramine" and insert instead -- and hexamethylene tetramine, said hexamethylene tetramine being present in a substantially uncombined state, --; lines 65 and 66, claim 12, strike out "containing substantially, unreacted hexamethylene tetramine," and insert instead -- and hexamethylene tetramine, said hexamethylene tetramine being present in a substantially uncombined state, --.

Signed and sealed this 18th day of April 1961.

(SEAL)
Attest:

ERNEST W. SWIDER
Attesting Officer

DAVID L. LADD
Commissioner of Patents